United States Patent [19]

Sakai et al.

[11] Patent Number: 4,675,763
[45] Date of Patent: Jun. 23, 1987

[54] MAGNETIC DISK DRIVE WITH A DISK LEVELING MECHANISM

[75] Inventors: Yoshiaki Sakai, Higashikurume; Hiroshi Tsuyuguchi, Tokyo; Yasushi Noda, Tokyo; Takahiro Sakaguchi, Tokyo, all of Japan

[73] Assignee: Teac Corporation, Tokyo, Japan

[21] Appl. No.: 694,872

[22] Filed: Jan. 25, 1985

[30] Foreign Application Priority Data

Feb. 3, 1984 [JP] Japan .................................. 59-17970
Feb. 17, 1984 [JP] Japan ............................ 59-21447[U]

[51] Int. Cl.⁴ ........................................... G11B 5/012
[52] U.S. Cl. ..................................................... 360/97
[58] Field of Search ..................................... 360/97–99

[56] References Cited

U.S. PATENT DOCUMENTS 4,149,207 4/1979 Porter ............................... 360/99 X
4,445,155 4/1984 Takahashi et al. .

FOREIGN PATENT DOCUMENTS 57-36473 2/1982 Japan .

Primary Examiner—A. J. Heinz
Attorney, Agent, or Firm—Woodcock Washburn Kurtz Mackiewicz & Norris

[57] ABSTRACT

An apparatus for data transfer with a magnetic disk having a diameter of, say, 86 millimeters, having a pair of transducer heads for data transfer engagement with the opposite surfaces of the disk mounted on a turntable driven directly by a disk drive motor. In order to hold the magnetic disk exactly level on the turntable for proper data transfer contact with the transducer heads, a leveling mechanism is provided whereby at least the turntable is made adjustably movable in its axial direction with respect to the frame of the apparatus, as by the manual turn of an adjusting screw or screws. In one embodiment, the turntable is movable with a drive spindle on which it is mounted coaxially and which forms an output shaft of the disk drive motor. In another embodiment, the turntable travels with the complete disk drive motor.

7 Claims, 8 Drawing Figures

MAGNETIC DISK DRIVE WITH A DISK LEVELING MECHANISM

BACKGROUND OF THE INVENTION

This invention relates to magnetic disk drives, or apparatus for data transfer with magnetic disks such as those commonly referred to as floppy disks, which may be housed in protective envelopes to make up disk cartridges or cassettes. More specifically, the invention pertains to such apparatus featuring means for holding the magnetic disk exactly level as it makes data transfer contact with a transducer head or heads.

In data transfer apparatus of the kind herein under consideration, a magnetic disk is placed on a motor driven turntable in positive engagement therewith, and a pair of transducer heads make data transfer contact with the opposite faces of the disk. The turntable is much smaller in diameter than the magnetic disk to allow the transducer heads to engage the opposite faces of the disk and to travel in its radial direction for track to track accessing. If the magnetic disk is of relatively large size, its flexibility will allow the transducer heads to make proper data transfer contact with the disk in the face of a slight difference in vertical position between the disk bearing surface of the turntable and the disk contacting surface of the lower transducer head.

The current trend, however, is toward the miniaturization of magnetic disks. Take, for example, the flexible magnetic disk cassette recently developed by Sony Corp., of Tokyo, Japan, and disclosed in Japanese Laid Open Patent Application No. 57-36473, laid open to public inspection on Feb. 27, 1982, and in corresponding U.S. Pat. No. 4,445,155 issued Apr. 24, 1984. It has a diameter of only 86 millimeters. The pair of transducer heads will not make proper data transfer contact with such a small sized magnetic disk unless it lies level on the turntable. The leveling of the magnetic disk has heretofore been possible only by manufacturing the disk drive mechanism, head support and transport mechanisms, and other associated parts of the apparatus to very close dimensional tolerances and by assembling them in exact relative positions so that the disk bearing surface of the turntable may be on a level with the disk contacting surface of the lower transducer head. This conventional solution is of course unsatisfactory from the standpoints of cost reduction and higher production constantly sought after by the industry.

SUMMARY OF THE INVENTION

The present invention makes it possible, in data transfer apparatus of the type in question, to readily adjust the relative positions of the turntable and the transducer head or heads so that the magnetic disk placed on the turntable may be held level as it is engaged by the transducer head or heads, for proper data transfer therewith.

Briefly, the present invention provides an improved data transfer apparatus comprising a turntable for driving engagement with a magnetic disk, a disk drive motor mounted to a frame and coupled to the turntable for driving the same, at least one transducer head supported on the frame for data transfer contact with the magnetic disk on the turntable, and a head transport mechanism for transporting the transducer head radially of the magnetic disk on the turntable to enable the head to access the usual tracks of the disk. Also included is a leveling mechanism for adjustably moving at least the turntable in its axial direction relative to the frame so that the magnetic disk on the turntable may be held level as it makes data transfer contact the transducer head.

Preferably, the disk drive motor is of the direct drive design, having an output shaft serving as the drive spindle on which the turntable is mounted directly for joint rotation therewith. In one embodiment of the invention the leveling mechanism provides for the axial travel of the turntable with the drive spindle, the latter being axially displaceable relative to the rotor and stator of the disk drive motor. In another embodiment the leveling mechanism causes the turntable to travel axially with the complete disk drive motor relative to the frame. Either way, the axial position of the turntable with respect to the predetermined position of the transducer head or heads can be readily adjusted as by turning an adjusting screw or screws. No excessive dimensional or positional accuracy is therefore required in the manufacture and assemblage of the pertinent parts of the apparatus.

The above and other features and advantages of the present invention and the manner of realizing them will become more apparent, and the invention itself will best be understood, from a study of the following description and appended claims, taken together with the attached drawings showing some preferable embodiments of the invention.

DESCRIPTION OF THE PREFERRED EMBODIMENTS

General

Figure 1:
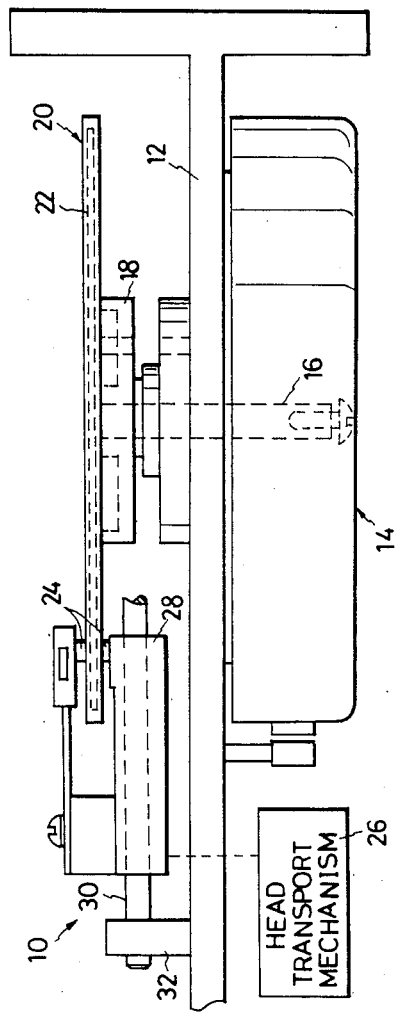
FIG. 1 is a fragmentary, diagrammatic elevation of the data transfer apparatus embodying the principles of this invention, shown together with a magnetic disk cartridge mounted in position therein.

The invention will now be described more specifically as embodied in the data transfer apparatus of FIG. 1, which is intended for use with a "microfloppy" magnetic disk cassette having a disk with a diameter of 86 millimeters. The representative data transfer apparatus 10 of FIG. 1 has a frame 12 to which is mounted a disk drive motor 14. This motor has an output shaft or drive spindle 16 extending upwardly therefrom and having a turntable 18 nonrotatably mounted thereon. The turntable 18 is shown to have mounted thereon the magnetic disk cassette 20, including a flexible magnetic disk proper 22, in driving engagement with the disk. Thus the rotation of the disk drive motor 14 is imparted directly to the turntable 18 and thence to the magnetic disk 22 of the disk cassette 20.

Arranged for data transfer contact with the opposite faces of the magnetic disk 22 are a pair of magnetic transducer heads 24 which are to be moved radially of the magnetic disk by a head transport mechanism 26 for accessing the usual data storage tracks on the disk. The transducer heads 24 are mounted on a carriage 28 slidably along a pair of guide rods 30, one seen, for such linear travel. The guide rods 28 are rigidly mounted on the frame 12 via a column 32.

Shown in block form for simplicity, the head transport mechanism 26 can be of conventional design including a bidirectional electric motor of the stepping type. The bidirectional rotation of the stepping motor is translated into the linear reciprocation of the head carriage 28 by a suitable rotary to linear converter, not shown, forming a part of the head transport mechanism 26. A well known steel belt wound into the shape of the greek alpha is an example of the rotary to linear converter.

Figure 2:
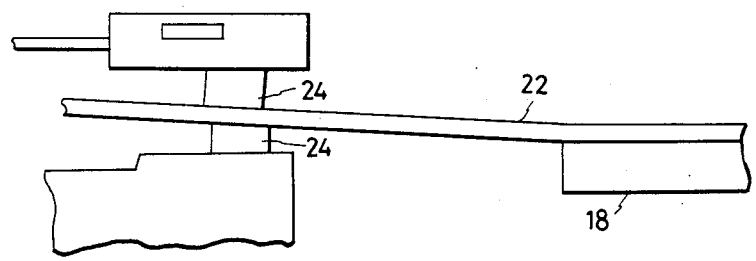
FIG. 2 is a fragmentary, diagrammatic elevation explanatory of one possible cause for the improper data transfer contact of the pair of transducer heads with the magnetic disk in the data transfer apparatus of FIG. 1.
Figure 3:
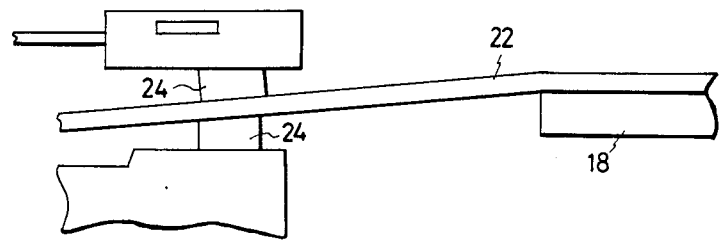
FIG. 3 is a view similar to FIG. 2 and explanatory of another possible cause for the improper data transfer contact of the transducer heads with the magnetic disk in the data transfer apparatus of FIG. 1.

FIGS. 2 and 3 are illustrations of the noted problem heretofore encountered in the data transfer apparatus of the above described general organization and solved by the present invention. The vertical position of the turntable 18 has been likely to be too low, as in FIG. 2, or too high, as in FIG. 3, with respect to that of the pair of transducer heads 24. In either case, the flexible magnetic disk 22 mounted on and engaged with the turntable 18 is not held level as it is caught between the transducer heads 24, preventing the heads to make proper data transfer contact therewith. This problem is absent from the data transfer apparatus 10 which incorporates a disk leveling mechanism in accordance with the invention.

Before proceeding further with the description of the data transfer apparatus 10, there will be given a brief explanation of the construction of the magnetic disk casette 20 for use with the apparatus, followed by a more detailed discussion of the disk drive motor 14, turntable 18, and disk leveling mechanism.

MAGNETIC DISK CASSETTE

Figure 4:
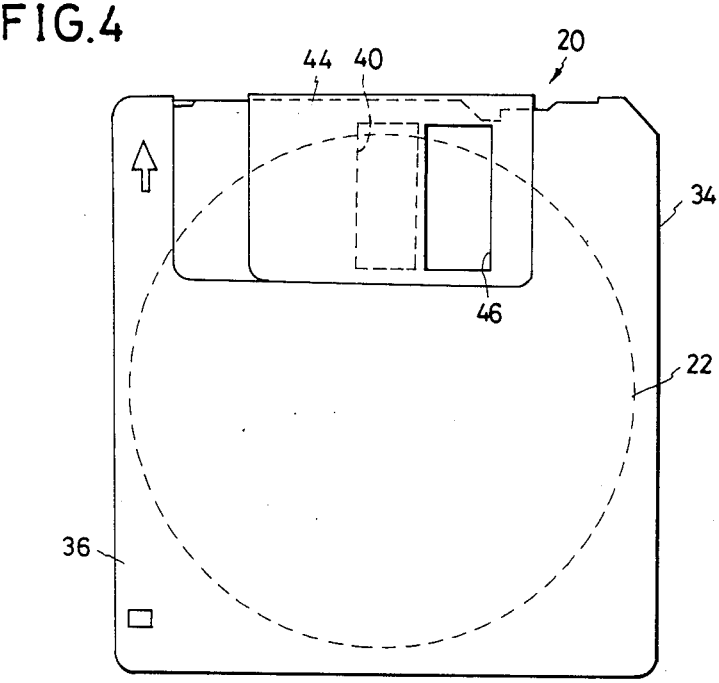
FIG. 4 is a top plan view of the magnetic disk cassette for use with the data transfer apparatus of FIG. 1.
Figure 5:
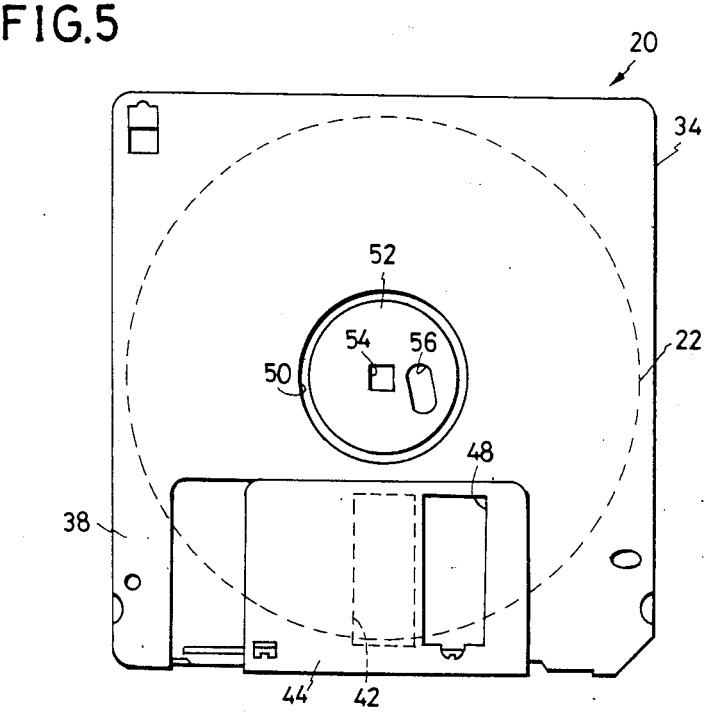
FIG. 5 is a bottom plan view of the magnetic disk cassette of FIG. 4.

With reference to FIGS. 4 and 5, the magnetic disk cassette 20 for use with the data transfer apparatus 10 has the flexible magnetic disk 22 with a diamater of 86 millimeters housed in a generally flat, square protective envelope 34. Formed in both front 36 and rear 38 surfaces of the envelope 34 are apertures 40 and 42 to expose radial portions of the magnetic disk 22 for data transfer contact with the pair of transducer heads 24 of the apparatus 10. Normally, the apertures 40 and 42 are held closed by a sliding shutter 44 in the form of a sheet of aluminum, stainless steel or plastics material bent into the shape of a U. The shutter 44 has itself two apertures 46 and 48 which are out of register with the envelope apertures 40 and 42 when the shutter is in the illustrated normal or right hand position under the bias of a spring (not shown). When forced leftwardly against the bias of the unshown spring, the shutter 44 brings its apertures 46 and 48 into register with the envelope apertures 40 and 42, respectively, thereby exposing the radial portions of the opposite faces of the magnetic disk 22 for data transfer contact with the transducer heads 24 of the apparatus 10.

The magnetic disk cassette 20 is to be placed upon the turntable 18 of the apparatus 10 with the front surface 36 of its envelope 34 oriented upwardly. Thus the rear surface 38 of the envelope 34 has a circular opening 50 defined centrally therein to allow engagement of the magnetic disk 22 with the turntable 18. Exposed through the central opening 50 is a hub 52 in the form of a disk of magnetic sheet metal attached centrally to the magnetic disk 22. The hub 52 has a square hole 54 defined centrally therein for the insertion of the drive spindle 16 of the apparatus 10, and a slot 56 defined eccentrically therein for a purpose yet to be described.

Disk Drive Motor and Turntable

Figure 6:
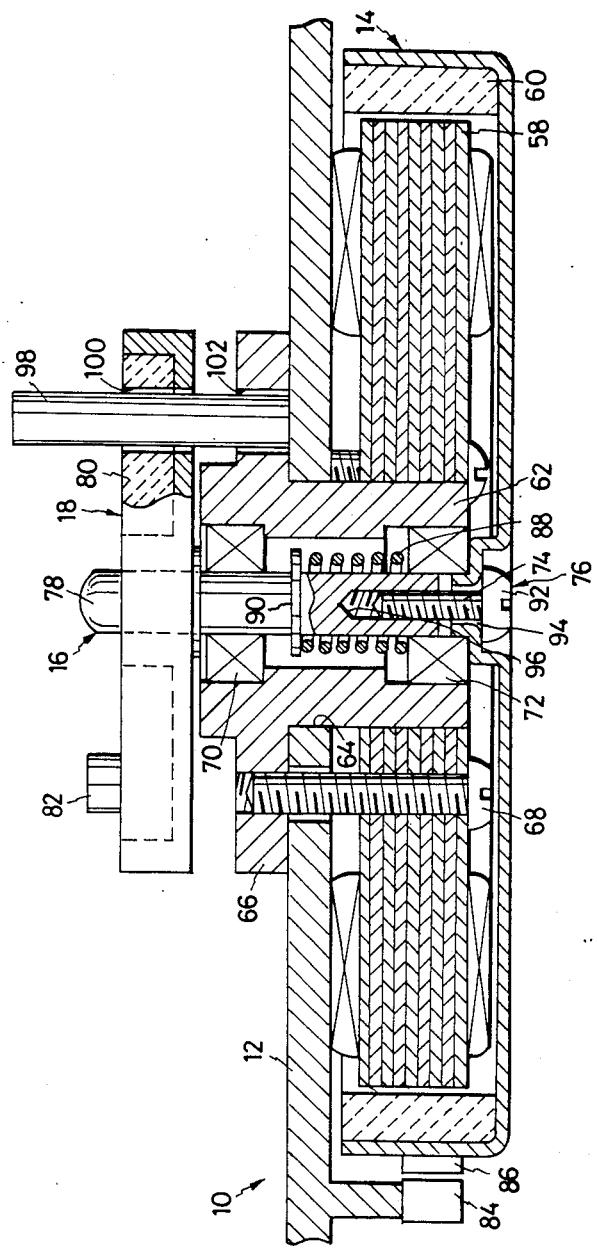
FIG. 6 is an enlarged axial section through the disk drive motor of the data transfer apparatus of FIG. 1, shown together with the leveling mechanism, turntable, etc.

As illustrated in an enlarged axial section in FIG. 6, the disk drive motor 14 is of the rotor outside stator configuration, having a stator 58 rigidly mounted to the underside of the frame 12 and a rotor 60 concentrically and rotatably surrounding the stator. The stator 58 is mounted to the frame 12 by being secured to a spindle sleeve 62 arranged axially of the disk drive motor 14 so as to surround the drive spindle 16 and extending upwardly through a hole 64 in the frame 12. The spindle sleeve 62 has a flange 66 overlying and engaging the frame 12. A plurality of mounting screws 68 extend upwardly through the stator 58 and frame 12 and threadedly engaged with the flange 66 of the spindle sleeve 62.

The drive spindle 16 is received with clearance in the spindle sleeve 62 and is supported by a pair of bearings 70 and 72 for both rotary and axial motion relative to the spindle sleeve and, therefore, to the frame 12 and stator 58. The rotor 60 is coaxially coupled to the drive spindle 16 via an adjusting screw 74 for joint rotation therewith. The adjusting screw might be considered a part of the disk leveling mechanism generally identified by the reference numeral 76, as will become more apparent presently.

Rigidly mounted on the top end portion 78 of the drive spindle 16 projecting from the sleeve 62, the turntable 18 has a permanent magnet or magnets 80 embedded therein in annular arrangement for attracting the metal made hub 52 of the magnetic disk 22 as the latter is loaded on the turntable. The top end portion 78 of the drive spindle 16 projects upwardly of the turntable 18 for insertion in the central hole 54 in the hub 52 of the magnetic disk 22. An upstanding drive pin 82 is formed eccentrically on the turntable 18 for driving engagement in the eccentric slot 56 in the hub 52 of the magnetic disk 22.

As will be understood by referring back to FIGS. 4 and 5, the magnetic disk 22 of the disk cassette 20 for use with the apparatus 10 has formed therein no index hole designed to make possible the determination of the angular position of the disk 22. Provided instead for sensing the angular position of the magnetic disk 22 is a revolution sensor 84, FIG. 6, such as a Hall effect device fixedly mounted to the frame 12 in the immediate adjacency of the rotor 60 of the disk drive motor 14. The rotor 60 has a permanent magnet 86 mounted in a preassigned angular position thereon with respect to the angular orientation of the magnetic disk 22 on the turntable 18. The magnet 86 electromagnetically acts on the revolution sensor 84 with each complete revolution of the rotor 60.

Disk Leveling Mechanism

Reference is directed also to FIG. 6 for a study of the leveling mechanism 76. As has been stated, the drive spindle 16 is not only rotatable but also movable axially with respect to the frame 12, disk drive motor stator 58, spindle sleeve 62, etc. A helical compression spring 88 is sleeved upon the drive spindle 16 and acts between a collar 90 thereon and the lower bearing 72, biasing the drive spindle, and in consequence the turntable 18 thereon, upwardly of the frame 12. Another important component of the leveling mechanism 76 is the aforesaid adjusting screw 74, having its head 92 located just under the disk drive motor rotor 60 and extending upwardly through a clearance hole 94 defined centrally therein to be engaged in a tapped hole 96 in the drive spindle 16. Thus, by turning the adjusting screw 74 in either direction, the drive spindle 18 can be moved axially up or down against or under the bias of the compression spring 88.

Seen at 98 is a removable lockpin for locking the turntable 18 against rotation while the adjusting screw 74 is being turned to adjust the vertical position of the turntable. The lockpin 98 is inserted into and through an eccentric hole 100 in the turntable 18 and in a hole 102 in the flange 66 of the spindle sleeve 62.

Operation

The magnetic disk cassette 22 of FIGS. 4 and 5 is loaded on the turntable 18 of the data transfer apparatus 10, with the surface 36 of its envelope 34 directed upwardly. In thus loading the disk cassette 22, the projecting end 78 of the drive spindle 16 is inserted in the central hole 54 of the magnetic disk 22, and the drive pin 82 on the turntable is engaged in the eccentric slot 56 of the magnetric disk. The driving engagement of the turntable 18 with the magnetic disk 22 will be completed as the permanent magnet or magnets 80 of the turntable attract the metal made hub 52 of the disk.

If the magnetic disk 22 loaded on the turntable 18 and caught between the pair of transducer heads 24 is not held level, as in FIGS. 2 or 3, then the vertical position of the turntable is in need of adjustment by the leveling mechanism 76. The adjusting screw 74 may be turned in a loosening direction to cause upward displacement of the drive spindle 16 with the turntable 18. Then, under the bias of the compression spring 88, the drive spindle 16 will travel upwardly of the frame 12 with the turntable 18. The adjusting screw 74 may of course be turned in a tightening direction to cause downward displacement of the drive spindle 16 with the turntable 18. So turned, the adjusting screw 74 will pull the drive spindle 16 downwardly against the force of the compression spring 88.

During such adjustment of the vertical position of the turntable 18, this turntable would revolve with the drive spindle 16 if the adjusting screw 74 were turned in either direction without locking the turntable against rotation relative to the frame 12 by the lockpin 98. Thereupon the drive pin 82 on the turntable 18 would move out of the preassigned angular relationship with the magnet 86 on the rotor 60 of the disk drive motor 14. This would make it impossible to ascertain the angular orientation of the magnetic disk 22 by the revolution sensor 84 acted upon by the magnet 86 on the disk drive motor rotor 60. The removable lockpin 98 is intended to prevent such undesired angular displacement of the turntable 18 with respect to the disk drive motor rotor 60. The lockpin 98 may be inserted into and through the hole 100 in the turntable 18 and further in the hole 102 in the spindle sleeve flange 66 before turning the adjusting screw 74.

Preferably, in a number of disk drives constructed in accordance with the present invention, the hole 100 in the turntable 18, the magnet 86 on the disk drive motor rotor 60, and the revolution sensor 84 on the frame 12 may be arranged in the same angular positions about the axis of the disk drive motor 14. As the index signals are recorded on the magnetic disks 22 as dictated by the revolution sensor 84 acted upon by the magnet 86 in such disk drives, the disks will become internchangeable as the index signals will be recorded in the same angular positions thereon.

SECOND FORM

Figure 7:
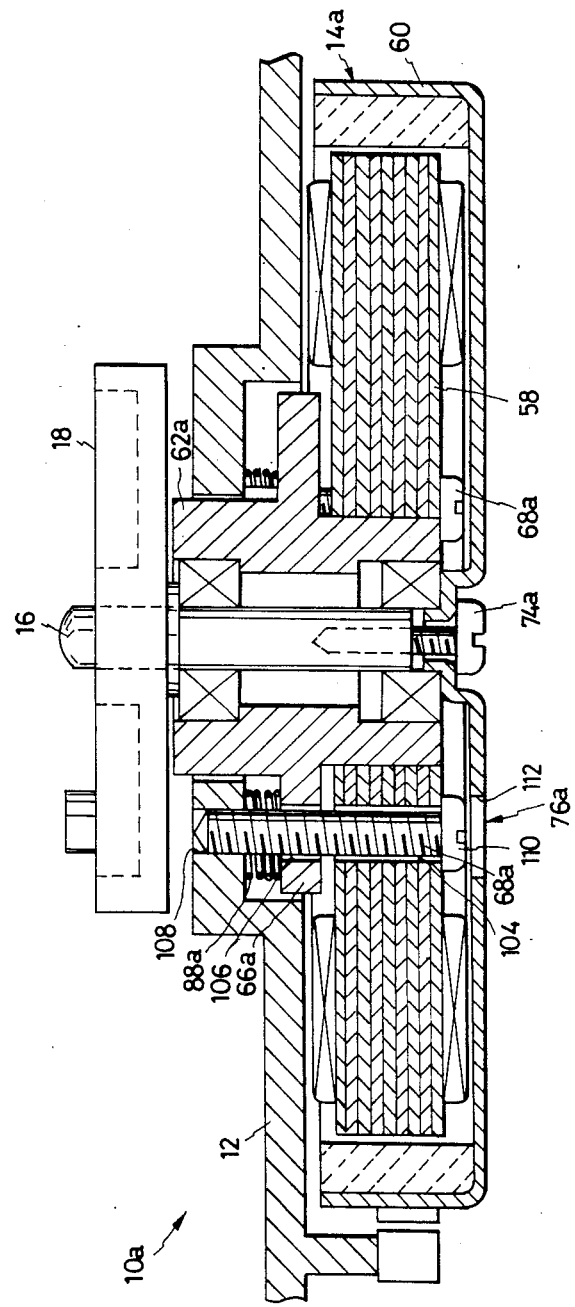
FIG. 7 is a view similar to FIG. 6 but showing another preferred embodiment of the invention.

FIG. 7 illustrates another preferred form of the data transfer apparatus in accordance with the invention. Generally designated 10a, the apparatus incorporates a modified leveling mechanism 76a whereby the turntable 18 is adjustably movable up and down with a complete disk drive motor 14a, including a spindle sleeve 62a, relative to the frame 12. In this embodiment, therefore, the adjusting screw 74 of the previous embodiment is replaced by a screw 74a which serves merely to rigidly connect the rotor 60 of the disk drive motor 14a to the drive spindle 16 to cause the joint rotation thereof with the rotor.

Figure 8:
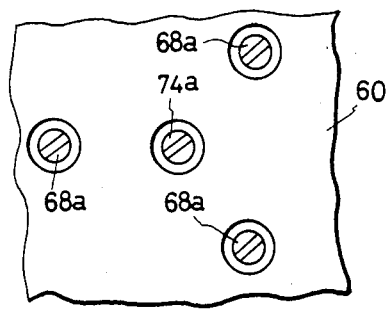
FIG. 8 is a fragmentary bottom plan view of the disk drive motor in the embodiment of FIG. 7.

For the desired axial displacement of the disk drive motor 14a with the turntable 18 relative to the frame 12, a plurality of, preferably three as seen in FIG. 8, mounting and adjusting screws 68a are provided which extend upwardly through clearance holes 104 in the disk drive motor stator 58 and through clearance holes 106 in the flange 66a of the spindle sleeve 62a and which are threadedly engaged in tapped holes 108 in the frame 12. It will be observed from FIG. 8 that the three mounting and adjusting screws 68a are equidistantly spaced from, and are arranged at constant angular spacings about, the axis of the disk drive motor 14a herein represented by the rotor mounting screw 74a. Sleeved upon each mounting and adjusting screw 68a, a helical compression spring 88a acts between frame 12 and spindle sleeve flange 66a to urge the latter, or the complete disk drive motor 14a as well as the turntable 18, downwardly. The slotted heads 110 of the mounting and adjusting screws 68a are accessible through holes 112 in the disk drive motor rotor 60.

The other details of construction of this data transfer apparatus 10a can be as set forth above in connection with FIG. 1. The magnetic disk cassette for use with this apparatus can also be of the construction depicted in FIGS. 4 and 5.

Operation of Second Form

For the adjustment of the vertical position of the turntable 18 by the leveling mechanism 76a of the data transfer apparatus 10a, the three mounting and adjusting screws 68a may be turned in either direction by inserting a screwdriver through the access holes 112 in the disk drive motor rotor 60. Turned in a tightening direction, the screws 68a will cause upward displacement of the complete disk drive motor 14a together with the turntable 18 relative to the frame 12 against the forces of the compressioin springs 88a. On being turned in a loosening direction, then, the screws 68a will allow the disk drive motor 14a and the turntable 18 to travel downwardly of the frame 12 under the forces of the compression springs 88a.

Thus, in this alternate embodiment, the usual stator mounting screws are used for the adjustment of the vertical position of the turntable for a simplicity of the construction of the leveling mechanism 76a. As an additional advantage of this embodiment, the turntable 18 is not to go out of the predetermined angular relationship with the disk drive motor rotor 60 during the adjustment of the vertical position of the turntable. No turntable locking mechanism is therefore required.

It will, of course, be understood that the preferred embodiments disclosed herein are meant purely to illustrate or explain and not to impose limitations upon the present invention, as a varieity of modifications or adaptations of the invention will readily occur to one skilled in the art on the basis of this disclosure. For example, the data transfer apparatus in accordance with the invention lends itself to use with magnetic disks of other than the cassette form shown in FIGS. 4 and 5, such as the magnetic disk disclosed in Castrodale et al. U.S. Pat. No. 4,089,029, which is intended to be clamped onto the drive shaft by a tapered collet engageable with a drive rim on the end of the shaft. Further, in the embodiment of FIG. 6, the lockpin 98 may not necessarily be inserted in the holes 100 and 102 in the turntable 18 and spindle sleeve flange 66, all that is required being that the turntable be locked against rotation relative to the frame 12.

What is claimed is:

1. A data transfer apparatus for use with a magnetic disk, comprising:
    (a) a frame;
    (b) a turntable for driving engagement with a magnetic disk in a coaxial relation thereto;
    (c) a disk drive motor mounted to the frame and coupled to the turntable for imparting rotation thereto and hence to the magnetic disk thereon, the disk drive motor comprising a stator fixedly mounted to the frame, a rotor concentrically and rotatably surrounding the stator, and a drive spindle arranged coaxially with the rotor for joint rotation therewith and having one end coupled directly to the turntable for driving the same, the drive spindle being displaceable axially with the turntable relative to the rotor and stator;
    (d) a transducer head supported on the frame for data transfer contact with the magnetic disk on the turntable;
    (e) a head transport mechanism for transporting the transducer head radially of the magnetic disk on the turntable for track to track accessing; and
    (f) a leveling mechanism for adjustably moving the drive spindle, together with the turntable thereon, in its axial direction relative to the rotor and stator in order that the magnetic disk on the turntable may be held on a level with the transducer head for proper data transfer contact therewith, the leveling mechanism comprising resilient means acting substantially between the frame and the drive spindle of the disk drive motor for biasing the drive spindle toward said one end thereof and an adjusting screw extending through a clearance hole in the rotor of the disk drive motor and threadedly engaged in a tapped hole defined axially in another end of the drive spindle, the adjusting screw being capable of turning bidirectionally from outside the disk drive motor for allowing the drive spindle to move toward said one end thereof under the bias of the resilient means and for pulling the drive spindle toward said other end thereof against the bias of the resilient means.

2. A data transfer apparatus as set forth in claim 1, further comprising means for locking the turntable against rotation relative to the frame during the axial movement of the drive spindle of the disk drive motor by the manipulation of the adjusting screw, in order to hold the turntable in a preassigned angular relation with the rotor of the disk drive motor.

3. A data transfer apparatus as set forth in claim 2, wherein the locking means comprises a removable lockpin capable of positive engagement with the turntable and with the frame.

4. A data transfer apparatus for use with a magnetic disk, comprising:
    (a) a frame;
    (b) a turntable for driving engagement with the magnetic disk in a coaxially relation thereto;
    (c) a disk drive motor mounted to the frame and coupled to the turntable for imparting rotation thereto and hence to the magnetic disk thereon;
    (d) a transducer head supported on the frame for data transfer contact with the magnetic disk on the turntable;
    (e) a head transport mechanism for transporting the transducer head radially of the magnetic disk on the turntable for track to track accessing; and
    (f) a leveling mechanism for adjustably moving the disk drive motor, together with the turntable coupled thereto, in its axial direction relative to the frame in order that the magnetic disk on the turntable may be held on a level with the transducer head for proper data transfer contact therewith;
    wherein the turntable is coupled to the disk drive motor for joint axial displacement therewith relative to the frame.

5. A data transfer apparatus as set forth in claim 4, wherein the disk drive motor comprises:
    (a) a stator mounted to the frame for axial displacement, while being locked against rotation, relative to the frame;
    (b) a rotor concentrically and rotatably surrounding the stator and constrained to joint axial displacement with the stator relative to the frame; and
    (c) a drive spindle arranged coaxially with the rotor and the stator for joint axial displacement therewith relative to the frame, the drive spindle being rotatable with the rotor and coupled directly to the turntable for driving the same.

6. A data transfer apparatus as set forth in claim 5, wherein the leveling mechanism comprises:
    (a) resilient means acting between the frame and the disk drive motor for biasing the latter away from the former; and
    (b) a plurality of adjusting screws extending through clearance holes in the stator of the disk drive motor and threadedly engaged in tapped holes defined in the frame, the adjusting screws being capable of turning bidirectionally from outside the disk drive motor for causing the disk drive motor to move toward the frame against the bias of the resilient means and for causing the disk drive motor to move away from the frame under the bias of the resilient means.

7. A data transfer apparatus as set forth in claim 6, wherein the adjusting screws of the leveling mechanism are equidistantly spaced from, and are arranged at constant angular spacings about, the axis of the disk drive motor.

* * * * *